United States Patent

Kroder

[15] 3,663,191
[45] May 16, 1972

[54] DIAMOND TOOL AND METHOD OF MAKING THE SAME

[72] Inventor: Ernest A. Kroder, Hellam, Pa.
[73] Assignee: Dentsply International Inc., York, Pa.
[22] Filed: July 23, 1970
[21] Appl. No.: 57,802

Related U.S. Application Data

[63] Continuation-in-part of Ser. No. 696,633, Jan. 9, 1968, abandoned.

[52] U.S. Cl..................................51/309, 51/293, 51/295
[51] Int. Cl..........................................C09c 1/68, B24d 3/02
[58] Field of Search ..........................51/293, 295, 297, 309

[56] References Cited

UNITED STATES PATENTS

| 3,306,720 | 2/1967 | Darrow | 51/293 |
| 3,293,012 | 12/1966 | Smiley | 51/293 |
| 3,508,890 | 4/1970 | Fontanella | 51/298 |
| 3,464,804 | 9/1969 | Kuratomi | 51/293 |
| 3,248,189 | 4/1966 | Harris | 51/309 |
| 3,378,361 | 4/1968 | Harris | 51/293 |

*Primary Examiner*—Donald J. Arnold
*Attorney*—C. Hercus Just

[57] ABSTRACT

A grinding and cutting tool comprised of diamond particles bonded to a support base member by the process of vapor deposition to form a metal lattice matrix chemically bonded to a surface of the diamond particles and metallurgically bonded to the support base member and the diamonds bonded to each other by inosculation, the reactions greatly enhancing the strength of the bonds.

A novel method of vapor deposition, controlled by electrical charges and by said means to impart kinetic energy to the ions of the vapor of sufficient velocity to cause penetration of said ions into the molecular structure of the support base causing a metallurgical reaction and into the molecular structure of the diamond surfaces causing a chemical reaction. In addition, by inducing a secondary electrical field, divergence of said ions can be controlled to cause said ions to be deposited in a predetermined pattern.

14 Claims, 9 Drawing Figures

INVENTOR
ERNEST A. KRODER

BY

ATTORNEY

FIG. 9

INVENTOR
ERNEST A. KRODER

BY
ATTORNEY

DIAMOND TOOL AND METHOD OF MAKING THE SAME

This application is a continuation-in-part of my application Ser. No. 696,633, filed Jan. 9, 1968 and now abandoned.

BACKGROUND OF THE INVENTION

It has been well known for centuries that diamonds are the hardest known substance on this planet. Accordingly, to cut and polish diamonds, only diamonds can be used. With the advancement of technology, other hard substances have been produced such as glass, porcelain, aluminum oxide, silicon carbides, metallic carbides, etc. Notwithstanding the development of these other hard substances, the diamond still remains the hardest known material and it is used to cut and form the above mentioned materials into useful shapes.

The majority of natural diamonds are of inferior grade for gem purposes and, therefore, can be economically crushed into grits and powders to make useful industrial tools, grinders, polishers and the like. Early primitive diamonds tools used for scarifying grain and carving intaglios in pottery and glass consisted of diamond attached to a suitable handle of wood or metal by natural resins or gums. As greater and greater productivity was required of the cutting tool, the strength of the bond became the weak link and, of necessity, new and better bonding materials were developed to adhere the diamond to the support base.

Since World War II and the advent of metal carbides the use of diamond tools for industrial and commercial purposes has increased tremenduously, and led General Electric Company into a development of synthesizing diamonds for industrial purposes. Industrial nations throughout the world, recognizing the need for an abundant supply of industrial diamonds, have followed suit and today not only the United States but Sweden, Russia and the Republic of South Africa have successfully synthesized the diamond by various means and are presently commercially producing them for the ever increasing commercial and industrial needs.

Among the products developed heretofore which utilize graded sizes of industrial diamond for abrading and cutting purposes are grinding wheels of substantially all different types and shapes known in industry, dental burs, many different types of grinding wheels, drills, honing tools, saws and many others.

The four most commonly used means and methods of adhering diamond to a support base are matrixes formed of (1) resins, (2) sintered metals, (3) vitreous materials, and (4) electroplating the support base and thereby encapsulating the diamond grit in the process. Basically, the procedure for adhering industrial diamond particles and grit to a support base by using resins or sintered metals are similar. The industrial diamond particles are intimately mixed with resin powders or powdered metals. The combined powder and diamond particles are compressed into a briquet over the support base and the powdered mixture is then heated in a furnace of an induction coil which creates sufficient heat to fuse the resin or to sinter the metal powders into a rigid mass. Either of these matrixes form only a mechanical bond and the matrix so formed offers little or no chip clearance.

Vitreous materials are generally glass-like and powders thereof are mixed with the diamond particles and are pressed in a usable form over the support base and then are heated, causing the glass to fuse to the support base and diamond particles. This type of bond is inherently weak, but the vitreous materials offer an advantage at least in providing chip clearance.

In the electroplating procedure, diamond particles are intimately held close to the support base member and are immersed in one of several standard plating baths. The support base acts as the annode and a base metal such as nickel or copper acts as the cathode. By the electroplating technique, a matrix of plated metal encapsulates the diamonds and at the same time adheres to the support base. In the use of electroplating procedures to adhere diamond particles to a base member, particularly where the spaces between the base members are of a very fine nature and small dimensions, the migration of metallic ions through said spaces between particles for electroplating deposition upon and bonding to the supporting surface of the base member is very limited. Accordingly, it is conceivable that a relatively extensive area of diamond particles, though being connected to each other by the electro-deposited metallic layer, nevertheless will be attached to the prepared surface of the base member of a tool actually only at spaced locations. Many of these situations result in early disintegration of the matrix and the layer of diamond particles affixed to the base member by electroplating deposition.

The above mentioned matrixes essentially form only a mechanical bond and, as such, do not have sufficient mechanical strength to retain the diamond particles affixed to the support base. With greater industrial productivity demands on the aforementioned tools it is mandatory that the matrix strength be increased to meet the needs of today.

To summarize the disadvantages of these, as well as other, known techniques for forming diamond tools, the following undesirable characteristics are itemized:

1. The matrix forms a purely mechanical bond.
2. The matrix is inherently weak in comparison to the compressive strength of the diamond.
3. The matrix forms a continuous surface that provides little or no chip clearance in the abrasive action of the tool against the material being cut.
4. The lack of chip clearance causes the tool to load or gall.
5. As a diamond is worn, due to the abrasive action of tools against the material being cut, the mechanical bonds are insufficient in strength to retain the diamond particles so that they will not fracture; whereby the worn diamond particles are torn from the matrix and ejected from the cutting tool before the full cutting ability thereof has been realized.
6. Resin matrixes are poor conductors of heat and consequently the rate of cut is limited by the ability of the matrix to remove heat (due to friction) from the material being abraded or cut.

The foregoing discussion principally has concerned the bonding of the matrix metal to diamond particles and to a metallic support base. However, it is known that many other articles of manufacture are either difficult to manufacture or are of inferior quality because of inability to obtain adequate bonding or intermixing of materials and compositions involved. Hence, while the example of forming diamond tools clearly illustrates certain specific manufacturing difficulties, the same are not to be restricted to said field of manufacturing since they also exist in many other fields of manufacturing, certain examples of which are set forth hereinafter.

SUMMARY OF THE INVENTION

The principal object of the invention is to apply vapor ions of one material to the surface of another material responsive to an electrical charge in such manner as to penetrate the molecular structure of the latter material and cause either a metallurgical reaction or a chemical reaction therewith, depending upon the materials involved, and thereby effect a physical change in the materials. This phenomenon is capable of being used for a number of different purposes in accordance with the invention, some of the more outstanding of which, but without limitation thereto, are as follows.

A stream of ions of one material may readily be impelled along either a fixed or variable path to deposit said material onto a second material for reaction therewith as aforesaid. The stream is highly susceptible to the development of kinetic energy by means of an electrical field induced between a source of said ions and said second material with which reaction is desired. Such field developes ion velocity of a magnitude sufficient to cause the desired degree of penetration of the aforementioned material. By employing suitable variable electrical charges which are imposed upon said stream of ions, desired patterns of deposition thereof upon said material may be effected for such reactions therewith. Among the exemplary applications of said foregoing principle is the formation of an alloy of beryllium-copper formed by projecting ions of beryllium into the molecular structure of copper and thereby produce at least a surface condition in the copper which, for example, may be subjected to precipitation hardening to provide a case-hardening of the copper.

Another practical application of the aforementioned principles of the invention is in regard to forming a matrix of sufficient strength to affix diamond particles to a prepared support base, comprising a tool, which may be of many kinds, types, and shapes and, as wear occurs at the cutting edge, the diamond particles are caused gradually to fracture and thus present successively sharp cutting edges. The matrix preferably forms a thin lattice encapsulating the diamond particles, which provides voids between said particles and thus provides chip clearance. Said matrix is applied in the form of an ionic vapor by utilizing the technique of vapor deposition. Such technique has the following distinct advantages over previously and presently used techniques:

1. The thickness of the deposited layer may be controlled with substantial accuracy.

2. The metallic matrix reacts chemically with the surfaces of the diamond particles to form a thin layer of metallic carbide and this chemical reaction progressively diminishes until a coating of pure metal encapsulates the individual crystals.

3. The matrix reacts metallurgically with a metallic support base of the tool to form an alloy which provides a very firm union between the matrix and said support base for the diamond particles.

4. The diamond particles adhere one to another and to the support base by inosculation to provide effective bonding.

5. Unless the layer of the matrix material is unduly thick, the matrix layer will be provided with numerous recesses or voids between the adjoining particles of coated diamonds and thereby provide a lattice-like chip clearance surface operable during abrading or cutting action by the tool to clear the same of the media being cut or abraded.

6. Because the diamond crystals are encapsulated by such metallic lattice, heat created by abrading action is readily conducted away from the cutting edges of the diamond particles to the metallic base member where said heat readily can be dissipated by conduction or by the use of liquid cutting compound.

7. The cavities or voids between adjacent coated diamond particles on the working surfaces of the tool can be impregnated with a solid or semi-solid lubricating material to reduce friction in dry grinding, and the lattice nature of the metal matrix will result in heat being dissipated rapidly.

8. Because of utilizing the technique of vapor-depositing the matrix metal in addition to imposing a static charge upon the diamond particles, said particles will orient themselves in such manner as to present a sharp cutting edge to the outer operative surface of the tool.

The bombardment of the matrix ions upon the diamonds and metallic base or substrate member causes the formation of a zone of molecules therebetween comprising a mixture of the diamond material and the substrate metal which will be in particulate form and composed of single molecules or aggregates of a small number of molecules.

Another object of the invention is to impart kinetic energy to the ions of the vapor with sufficient velocity to cause penetration of the molecular structure of the support base by said ions, thereby causing a metallurgical reaction therewith and also cause penetration of the molecular structure of the diamond particle surfaces by such ions and causing a chemical reaction therewith. In addition, by inducing a secondary electrical field in the vapor deposition system, divergence of said ions can be controlled in various ways to cause said ions to be deposited in a predetermined pattern upon the supporting base and diamond particles thereon. The prepared support base is simultaneously moved unidirectionally at a predetermined speed in a direction transverse to the predetermined pattern of parallel stripes or rows of said stream of metal ions, whereby a coating or layer of matrix of higher degree of uniform thickness than possible by known techniques now used is applied over the entire layer of diamond disposed upon said support base.

A further object of the invention is to deposit said stream of metallic ion vapor automatically by the technique described above which results simultaneously in the matrix chemically combining with the outer surfaces of the diamond particles to form carbides and also combine metallurgically in the form of an alloy with the prepared surface of the metallic support base, thus providing firm bonds of the matrix both to the diamond particles and base member as well as connecting together the adjacent diamond particles by a metallic inosculation extending between adjacent diamond particles.

Still another object of the invention is to utilize preferably hard metals as the principal matrix material which is applied directly to the outer surfaces of the diamond particles and the prepared surface of the base member, such hard metals, without limitation thereto, being selected from the general class comprising chromium, cobalt, iron, molybdenum, nickel, tantalum, titanium, tungsten, vanadium, and similar metallic materials capable of forming carbides.

Another object of the invention is to provide in certain tools, a limited resilience and yieldability between adjacent diamond particles, thus rendering said particles capable of sustaining reasonable shock as when such a tool is subject to relatively coarse use such as when effecting a relatively coarse or deep cut or abrading operation, one example of which would be effecting a preliminary rough or coarse sizing operation prior to final finishing or the like. This is accomplished by the steps as outlined above, after the hard metal process is concluded and prior to inosculation occurring. Inosculation then will be accomplished by a second layer of metals of the general class known as the relatively soft metals comprising, for example, copper, zinc, lead, aluminum, tin, etc., but without limitation thereto, which soft metals are applied by the vapor deposition process described above.

Still further objects of the invention are to adapt the principles of the same to other fields of manufacturing to connect or intermix various materials to or with each other by means of transforming one material into ionic condition and impelling such ions under controlled conditions into contact with another material capable of accepting an electrical charge, whereby the ions penetrate the molecular structure of said another material to effect desired bonding or intermixing therewith.

Details of the foregoing objects and of the invention, as well as other objects thereof, are set forth in the following specification and illustrated in the accompanying drawings comprising a part thereof.

DESCRIPTION OF THE PREFERRED EMBODIMENTS

Diamonds employed for industrial purposes are available in many different shapes and size ranges, said ranges extending from less than 1 micron up to 80 microns, and particles larger than 80 microns are classified according to mesh size and range from 400 to 20 mesh. Above 20 mesh, diamond is classified according to carat size. Diamond of this type also is usually classified according to general shape in that certain shapes of particles are preferred for different uses to which tools, upon which diamond particles are mounted, are to be employed.

Figure 1:
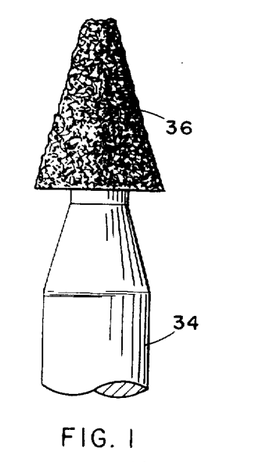
FIGS. 1–3 are respectively side elevations of typical, exemplary shapes of abrading and cutting tools to which the present invention is applicable, said tools comprising grinding heads affixed to supporting shafts shown in fragmentary manner.
Figure 2:
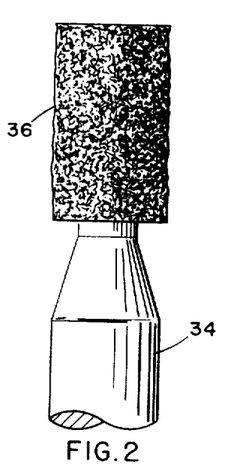
Figure 3:
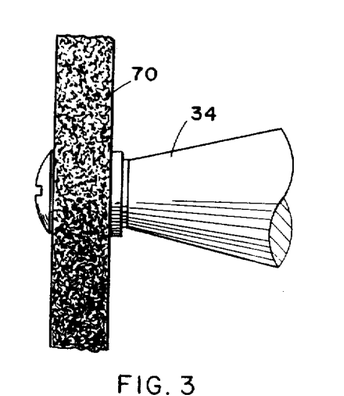

Tools of the type to which the present invention is applicable extend over a wide range, including grinding wheels, drills, burs, hones, saws, rotary dressing wheels, and the like. Not only are those tools used in general industrial operations, but also in certain professional operations, such as diamond burs used in dentistry, these being employed especially in situations where high speed cutting operations are desired. It also should be understood that the various shapes of the support base, and especially the prepared surfaces thereon to which the diamond material is applied or affixed, substantially are unlimited in variety, particularly where certain contoured surfaces are to be produced or finished by the use of such tools. In this regard, therefore, FIGS. 1–3 are included in the drawings to illustrate only a very limited number of the possible different shapes which may be employed, for example, in dental burs or grinding wheels alone, and the shapes in which the support base of industrial types of tools may be formed has not even been attempted to be shown in the drawings because of the wide possibilities of such shapes.

Figure 4:
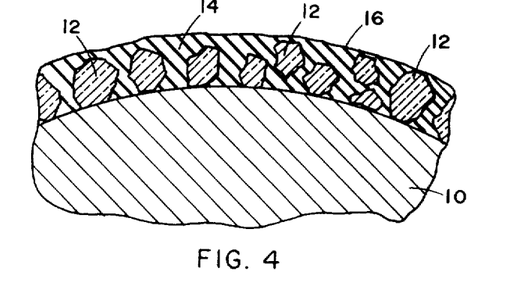
FIG. 4 is a fragmentary, enlarged transverse sectional view of a type of abrading tool presently available and over which the present invention is an improvement.
Figure 5:
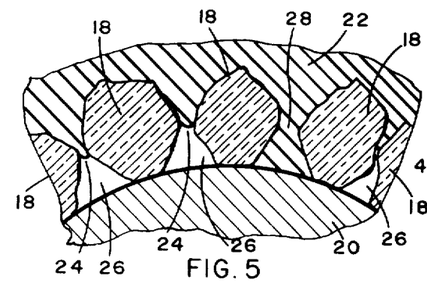
FIG. 5 is a fragmentary, still further enlarged transverse sectional view of still another type of abrading tool presently available and over which the present invention is an improvement.

In an effort to contrast the known art with the present invention, attention is directed to FIGS. 4 and 5 in which currently used diamonds tools are illustrated in exemplary form. Referring to FIG. 4, a fragmentarily illustrated sectional view of a support base 10 is shown, which, for example, may be formed from metal. Diamond particles 12 of a certain range of desired sizes are illustrated in exemplary manner as having been mixed with a layer of matrix material 14, which may be of several kinds.

One commonly used form comprises appropriate synthetic resins into which the diamond particles 12 are mixed and then a layer of preferably uniform thickness is applied to the prepared or working surface of the support base 10, followed by compressing the material suitably onto such surface, in a mold, for example, and then subjecting the same to appropriate heat for an adequate period of time to cure the resin and thereby also attempt, at least in a somewhat mechanical manner, to adhere said mixture of materials to the prepared surface of the support base 10.

As a variation to the foregoing construction and method of forming a diamond tool, the matrix material 14 may comprise metal powders of desired kind and size with which the diamond particles 12 are mixed and a layer of the mixed material is applied to the prepared surface of support base 10 and is suitably compressed thereon, preferably so as to have a uniform thickness, and said layer then is subjected to sintering heat to stabilize the matrix material 14.

It will be seen from FIG. 4 that the diamond particles 12 are intermixed throughout the matrix material 14, whether sintered metal or synthetic resin, in such manner that, at least initially and normally, only relatively few, if any, actual surface portions of the diamond particles are exposed at the outer periphery 16 of the matrix layer. Hence, in use, such peripheral surface will have to be used sufficiently that, through frictional engagement with a workpiece, for example, surfaces of the diamond particles 12 ultimately become exposed in a manner to render the same effective for abrading and cutting purposes. However, one of the outstanding deficiencies of an abrading or cutting tool of this type is that there are no crevices or cavities in the peripheral surface of the matrix within which material removed by the diamond particles from a workpiece may accumulate until expelled during normal operation of the tool.

In effect, therefore, a tool of this type is constantly "loaded," similarly to cutting tools such as normal grinding wheels formed from carbides in a baked ceramic matrix, for example, in which material removed from a workpiece by abrading or cutting becomes embedded within the inherent minute cavities and crevices in the peripheral surface of a tool. Cutting wheels of this type and the like, upon becoming "loaded" in such manner, are highly inefficient and actually are unsatisfactory for further use because, in addition to not abrading or cutting efficiently, they actually burn or burnish the workpiece in an undesired manner. Such tools may sometimes be salvaged to a limited extent by appropriate dressing operations. Under the circumstances, therefore, diamond tools of the type illustrated in exemplary manner in FIG. 4 are incapable of utilizing the diamond particles in a very efficient manner because of the deficiencies set forth above.

In addition, the lack of actual integral bonding between the matrix material 14 and the prepared surface of the support base 10 against which the matrix material is applied comprises another undesirable deficiency in tools of the type illustrated in exemplary manner in FIG. 4. Also, a still further deficiency resides in the fact that, for example, when one of the diamond particles 12 which is exposed and is in abrading or cutting position is subjected to sudden shock, such as by engaging a high spot in a workpiece or possibly when engaging a harder area of work surface than other adjacent areas, there is a tendency to flick the diamond particles from the matrix 14. Upon this occurring, the entire diamond particle usually is lost, especially in view of the relatively small size thereof, and the efficiency and life of the tool correspondingly are further diminished.

In FIG. 5, another means for bonding a layer of diamond particles 18 to the peripheral surface of a support base 20 in accordance with presently used techniques, is shown in exemplary manner. According to this additional technique, a metallic matrix layer 22 is applied by electro-deposition over a layer of diamond particles 18 which have been initially adhered to the peripheral surface of the support base 20 by known techniques. One of the inherent deficiencies resulting from applying the metallic matrix layer 22 by electro-deposition mechanism is that, under circumstances, where as illustrated in FIG. 5, certain adjacent diamond particles 18 have a very limited space 24 therebetween, the electrolyte does not readily flow therethrough.

Accordingly, in view of the foregoing, voids 26, which are shown in exemplary manner in FIG. 5, occur adjacent the periphery of the support base 20. Thus, it is only where a space 28, for example, shown in exemplary manner in FIG. 5, is sufficiently large that the electrolyte may normally pass therethrough into contact with the peripheral surface of support base 20 that any sort of union between the metallic matrix layer 22 and the support base 20 occurs. Obviously, the strength of such bonding between matrix layer 22 and the support base 20 is inefficient and if the number and sizes of the voids 26 are of sufficient extent, relatively rapid disintegration of the matrix layer 22 and the diamond particles 18 contained therein will occur incident to use thereof.

In addition to the foregoing deficiency of the electroplated embodiment of tool shown in FIG. 5, there is a tendency for the electro-deposited metallic matrix layer 22 to coat the diamond particles 18 unevenly and thereby substantially minimize the formation of cavities or crevices in the peripheral surface of the layer 22 in which material removed by the tool during abrading and cutting operations may accumulate until it is dislodged therefrom in use. The ready inability to resist shock, which results in wasted flicking of partially fractured or entire diamond particles 18 from the matrix, as described above in regard to the embodiment shown in FIG. 4, also is a further deficiency of the embodiment shown in FIG. 5.

Figure 6:
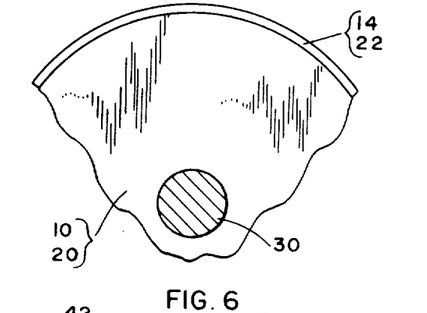
FIG. 6 is a fragmentary side elevation of a segmental portion of a typical diamond wheel or disc of the type presently used in industry.

One typical example of conventional cutting wheel in which the known embodiments described above with respect to FIGS. 4 and 5 may be employed is illustrated in FIG. 6. It will be understood that the support bases 10 or 20, as shown in FIG. 6, may comprise a metallic disc of desired diameter and thickness. A matrix layer 14 or 22 is affixed to the peripheral prepared surface of the support base 10 or 20 by one of the techniques described above with respect to the embodiment shown in FIGS. 4 and 5. The tools thus formed may be mounted upon a suitable shaft 30 for operation with respect to workpieces in accordance with known techniques. From this exemplary illustration which is shown in fragmentary manner, it will be seen that the matrix layer 14 or 22 is relatively thin, under normal circumstances, compared with the diameter of the tool. However, particularly where such tools comprise dental burs, for example, it will be appreciated that the relatively small diameter of the base member will result in the matrix layer being relatively thicker in comparison with the diameter of the support base than in the exemplary illustration shown in FIG. 6.

The foregoing description concerning FIGS. 4–6 is in regard to known diamond tools manufactured in accordance with existing techniques and principles presently employed in the industry. In an effort to overcome the deficiencies referred to above in regard to such known tools and techniques, the present invention has been devised for purposes of bonding diamond, and especially diamond particles of relatively small sizes, to a support base of any desired shape more effectively and efficiently than is afforded by the known techniques. The techniques used in accordance with the present invention and the resulting products produced thereby are set forth hereinafter as follows.

Essentially, the newly proposed techniques utilize a metallic matrix which is firmly bonded to diamond particles and a prepared surface of a base member of a tool by chemical and metallurgical phenomena in which the metallic matrix is in vapor form and is applied, for example, by one of several machines or mechanisms described hereinafter. In regard to the preferred embodiment of utilizing the same, the metallic vapor is applied in the form of a stream which is oscillated in successive parallel paths transversely across the prepared surface of the support base of a tool while said surface is moved relative to said stream in a direction transverse to the paths traversed by said stream of vaporized matrix material.

The aforementioned technique and method which comprises part of the present invention provides a substantial number of distinct advantages which are enumerated as follows, but such enumeration is not necessarily in the order of the importance of such advantages.

1. A chemical bond is formed between the matrix vapor and the outer surfaces of the diamond particles or crystals which is far stronger than a purely mechanical bond of the type obtained by the techniques described above relative to FIGS. 4 and 5.

2. A metallurgical bond is formed between the prepared surface of the support base of the tool and the matrix metal applied thereto. Depending upon the specific manner in which the matrix vapor is applied, the metallic matrix may be of a relatively solid nature but, otherwise, said matrix may have a lattice-like surface affording depressions and cavities which readily provide for chip clearance during abrading and cutting action of the tool against the surface of a media upon which the tool is being operated.

3. Especially when diamond particles are encapsulated within a metal lattice, heat created by abrading and cutting actions during use of the tool readily is conducted away from the cutting edges of the diamond particles and is imparted to the support base from which it readily can be dissipated by conduction or by the use of liquid cutting compounds.

4. If desired, the voids or cavities between adjacent diamond particles can be impregnated with a solid or semi-solid lubricating material so that, especially for dry grinding, and due to the lattice configuration of the metal matrix, heat resulting from operation of the tool also will be rapidly dissipated.

5. Due to the technique of vapor deposition of the metallic matrix in conjunction with the application of a static charge thereon, the diamond particles will orient themselves in a manner which will present sharp cutting edges of the particles with respect to the outer periphery of the matrix.

6. Due to the application of the metallic matrix in vapor form to a layer of diamond particles upon the prepared surface of the support base of the tool, a substantially uniform thickness of matrix layer may be applied to substantially all surfaces of the various diamond particles, the vapor migrating even into relatively small voids or spaces between adjacent diamond particles as well as between said diamond particles and onto the prepared surface of the support base so as to bond firmly therewith and, even more importantly, the thickness of said matrix coating upon the diamond particles may be controlled to a high degree of accuracy.

7. A chemical reaction occurs between the metallic matrix in vapor form and the surfaces of the diamond particles to form at least a very thin layer of metallic carbide which is bonded chemically to the diamond particles and, upon continuing the deposit of the metallic matrix vapor, the outer portions of the matrix layer will be composed substantially of metal only, but such layer will be most firmly bonded to the diamond particles.

8. The metallic matrix vapor also metallurgically reacts with the metallic peripheral surface of the support base to form at least a thin layer of an alloy composed jointly of the matrix metal and the metal of the support base, whereby upon continued application of the metallic matrix vapor to the surface of said support base, the outer portions of said layer will be composed substantially completely of matrix metal which, however, will be most firmly bonded to the support base.

9. The preferred metals to form the matrix are those of a hard nature so as to add substantial strength to the bonding of the diamond particles to the support base. However, especially to adapt the tool to relatively rough cuts or grinds, such as of a preliminary nature in regard to desired operations upon a workpiece, applications of additional matrix metal of a softer nature may be utilized to effect, for example, substantially final bonding by inosculation between adjacent diamond particles as well as a similar inosculation bond between the diamond particles and the support base, whereby the diamond particles may sustain a limited amount of shock without being separated from the base member or the matrix metal and thereby enhance the efficiency and useful life of the tool.

Figure 7:
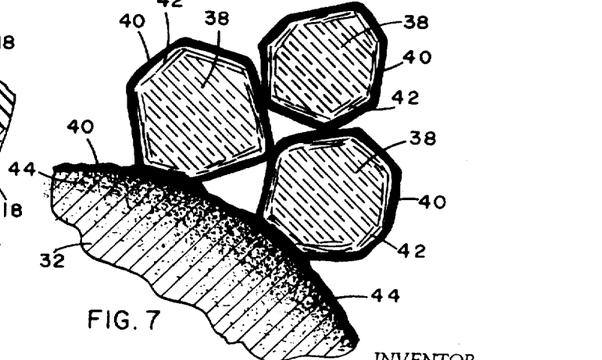
FIG. 7 is a very substantially enlarged, fragmentary transverse sectional view illustrating a typical arrangement of diamond upon an abrading and cutting tool formed in accordance with the principles of the present invention.
Figure 8:
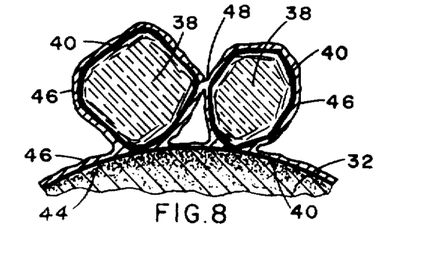
FIG. 8 is a view similar to FIG. 7, but showing a still further refinement of the type of structure shown in FIG. 7 and comprising part of the present invention.

The advantages and attributes of the present invention as enumerated above are exemplified in the drawings particularly in FIGS. 7 and 8. Referring to FIG. 7, for example, which is a very greatly enlarged, fragmentary transverse sectional view of a portion of an exemplary tool, the support base 32 is formed from suitable metal, such as steel. Without restriction thereto, particularly if the invention is applied to a dental bur, for example, the support base 32 may be a desired length of steel rod of suitable diameter. Referring to FIGS. 1 and 2 in such regard, wherein several exemplary useful shapes of the operative heads of dental burs are illustrated, it will be seen that the stems 34 are suitably reduced in diameter to provide an extremity upon which the cutting or grinding head 36 is formed in accordance with the principles of the invention, to provide so-called diamond burs, which are illustrated in greatly enlarged manner.

Figure 9:
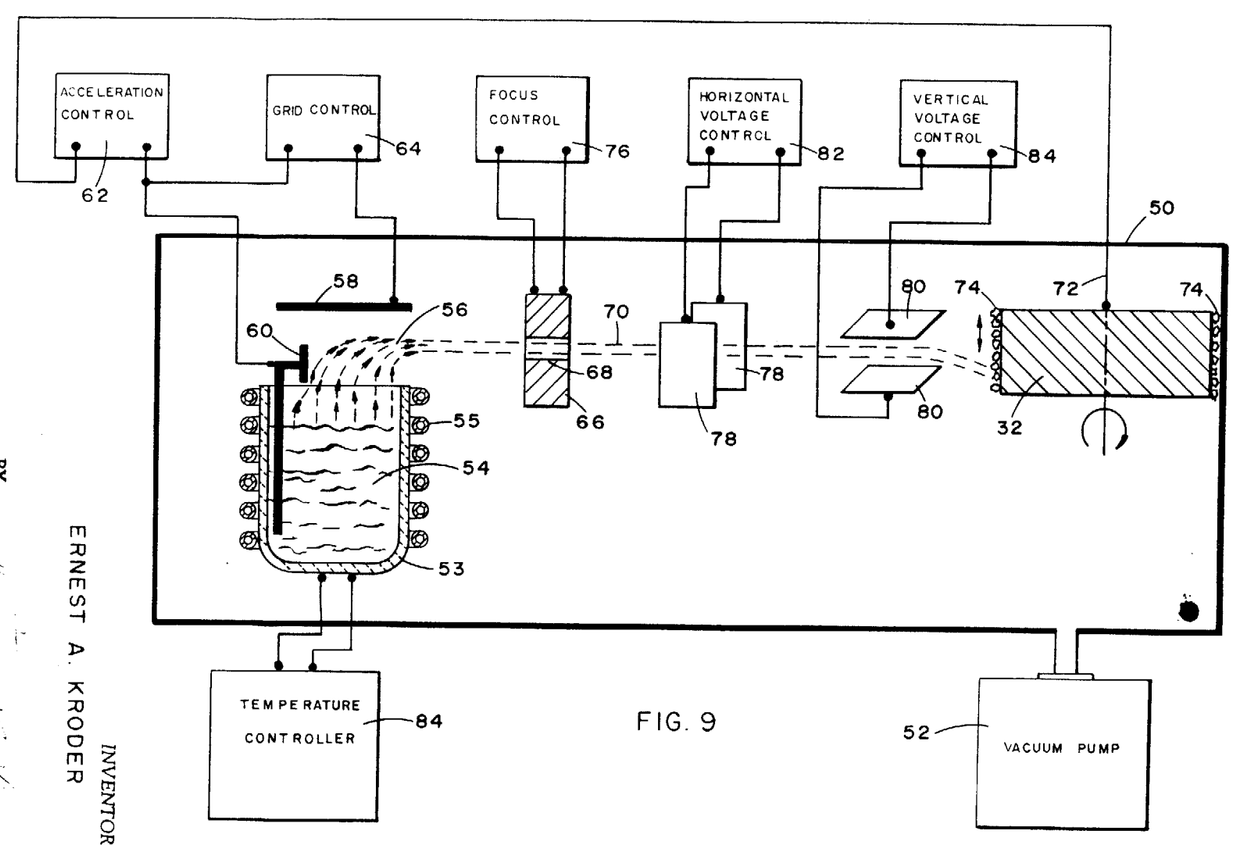
FIG. 9 is a diagrammatic illustration of one type of apparatus by which vapor deposition of a metal matrix upon abrading and cutting tools may be effected in accordance with the principles of the present invention by a process comprising part thereof.

The diamond particles 38, in FIG. 7, are substantially entirely coated with a relatively even thickness of matrix metal 40, which is applied thereto in vapor state by one of the arrangements or mechanisms shown in FIG. 9 for example. As indicated above, the matrix metal preferably is of a hard nature, such as chromium, cobalt, iron, molybdenum, nickel, tantalum, titanium, tungsten, vanadium, zirconium and the like. Details of the operation of the exemplary arrangement shown in FIG. 9 are set forth hereinafter.

In manufacturing diamond tools in accordance with the invention, the support base 32 is suitably shaped and finished to provide a prepared surface to which the diamond particles 38, selected to be of a desired range of sizes which are effective to accomplish a certain operation on a specific type of material or object are to be bonded. These particles are initially adhered to the prepared surface of the base member 32 in any desired manner, in accordance with existing techniques, such as simply by rolling the particles under pressure into the surface of the base member 32.

More effective preliminary adherance of the diamond particles upon such surface is accomplished, however, by utilizing one of the various known adhesives, such as those now employed in the electro-deposition of nickel, for example, as a matrix metal upon diamond. In utilizing such adhesive with the principles of the present invention, said adhesive is displaced by the vapor deposition of the matrix metal. Still another satisfactory means for initially adhering the diamond particles suitably upon the prepared surface of the support base is to impose an electrical charge upon the metallic support base in such a manner that it will orient the diamond particles and hold them suitably upon the base member during the vapor deposition process.

When the base members have had the preliminary attachment of diamond particles effected by any of the means referred to above, or other equivalent means, such prepared arrangement is then subjected to vapor deposition of the matrix metal 40, such as by the mechanism shown in FIG. 9 and described in detail hereinafter. When in vapor state, one of the matrix metals of the class referred to above will react with the outer surface of the diamond particles to form a thin metal carbide layer 42 thereon. This is represented diagrammatically in FIG. 7 by a series of irregular lines generally parallel to the various portions of the illustrated matrix metal 40 and disposed between such layer of matrix metal and the body portion of the diamond particles 38 in FIG. 7. Such metallic carbide effects a firm and durable union with the body portion of the diamond particles 38.

Upon continued deposition of metallic matrix vapor after formation of the metal carbide union, the coating 40 will continue to be formed upon a thin layer of said metallic carbide and firmly and chemically unite therewith in a manner similar to the chemical union between the metallic carbide 42 and the diamond particles 38. Under such circumstances, the outermost portions of the layer of matrix metal 40 will be substantially pure matrix metal, rather than being a carbide.

At the locations where the metallic matrix layers on the various diamond particles contact each other, a firm, strong bond is effected between the particles in a manner known as inosculation which is far superior to the purely mechanical bond between the diamond particles and the matrix layer of the conventional tool structures illustrated in exemplary manner in FIGS. 4 and 5. In addition, by being able to control the thickness of the matrix layers 40 quite precisely, as is possible with the present invention, it is obvious that lattice-like exterior surfaces will be provided upon the exterior or working surface of the tool, affording recesses and depressions between adjacent, coated diamond particles highly suited for the reception of ground or cut material removed from a workpiece until the same is discharged from the tool during the normal movement or rotation thereof, frequently at relatively high speeds.

As indicated above, the vapor-deposited matrix metal 40, in ionic state, contacts and reacts with the surface of the metallic support base 32 and forms at least a thin layer or zone of alloy comprising a mixture of the respective metals of the matrix and support base 32. Such a thin layer of alloy is indicated somewhat by stippling in FIG. 7, somewhat in exaggerated manner to render it apparent. Hence, it will be seen that a metallurgical bond possessing high strength and durability is provided between the matrix metal 40 and the support base 32 in those areas where the matrix metal directly contacts the support base. Such a metallurgical bond also is established between the matrix metal 40 which enrobes the diamond particles 38 in the vicinity of the surfaces of the diamond particles 38 adjacent support base 32. Accordingly, a highly effective and permanent type of strong bond is established between the diamond particles 38 and the support base 32 as a result of the chemical and metallurgical bonds described hereinabove.

Due to the above-described effective bonding between the diamond particles and the support base 32, for example, and particularly when the base metal has been selected from one of the aforementioned so-called hard metals, the diamond particles remain effectively connected to the support base 32 during the various operating procedures to which the tool is subjected in use. Particularly under circumstances where the layer of matrix metal is not abnormally thick, whereby various recesses and crevices are provided on the peripheral surface of the tool to form a lattice effect, chip clearance is readily accomplished and, as a result, the tool exhibits substantially no tendency to gall or become "loaded" with material removed from a workpiece.

Especially when the matrix metal 40 is of a hard nature, abrading and cutting tools of the type described which embody the same are particularly suited for relatively fine, finishing operations under circumstances where light abrading and cutting is desired, as distinguished from heavier types of abrading and cutting, as during initial or preliminary operations on workpieces which subsequently are to be followed by finer, finishing operations. Heavier types of operations normally subject the tools to shock as, for example, when the diamond particles, which are the cutting elements, encounter high spots or harder areas of the surfaces of the workpieces engaged thereby.

The present invention also provides means by which abrading and cutting tools of the type to which the invention pertains may be utilized for relatively coarse or heavy abrading and cutting through the provision of matrix means which afford at least limited resilience or elasticity accomplished by inosculation. Such an arrangement is illustrated in exemplary manner in FIG. 8, wherein it will be seen that the support base 32 has several exemplary and representative diamond particles 38 thereon. These have been coated to a limited extent by relatively hard matrix metal 40. Following the application of the hard matrix metal, a layer of predetermined thickness of relatively soft matrix metal 46 is applied by the same vapor deposition procedure as is used to apply the matrix metal 40.

Among the appropriate and useful relatively soft metals which may be utilized for this purpose are aluminum, zinc, lead, tin and copper. The resilient effect of such softer metals is particularly evident where the layers thereof on adjacent diamond particles contact each other to form a joint 48, as shown in FIG. 8. The outer layer of such soft matrix metal 46 is metallurgically bonded to the relatively harder layer 40 of matrix metal, whereby a firm bond therebetween is established. Accordingly, at the localities where the outer layers 46 on adjacent diamond particles or the support base 32 contact each other, resilient or somewhat yieldable connections 48 are made between such contacting layers of soft matrix metal 46. The relatively soft nature of such coatings affords at least a limited amount of resilience or elasticity which is more capable of withstanding shock when the diamond particles are subjected thereto than connections between the adjoining layers of hard matrix metal on the diamond particles as shown, for example, in FIG. 7.

In regard to the various embodiments of matrix materials described hereinabove, it will be seen that especially when the same is applied in layers of limited or restricted thickness, the resulting structure is in the nature of a metallic lattice. This is highly suited for the conductivity of heat created by any particular abrading or cutting action, whereby the heat readily is conducted away from the cutting edges of the diamond particles to the support base from which it readily can be dissipated by conduction or by the use of liquid cutting compound. Further, if desired, the voids between the diamond particles can be impregnated with a solid or semi-solid lubricating material, not shown, and because of the provision of the metal lattice matrix structure, heat will still be dissipated rapidly under normal operating conditions.

The bombardment of the matrix ions upon the diamonds and metallic base or substrate member causes the formation of a zone of molecules therebetween comprising a mixture of the diamond material and the substrate metal which will be in particulate form and composed of single molecules or aggregates of a small number of molecules.

Further, the ability to control the thickness of the coatings of matrix metal upon the diamond particles as well as upon the peripheral surface of the support base results in the possibility of forming tools which are highly suitable for specific abrading and cutting operations. Particularly in view of the aforementioned lattice-like configuration of the exterior surface of the metallic matrix layers, chip clearance is readily accomplished with the attending freedom from loading the tool with abraded material removed from a workpiece.

As indicated hereinabove, the preferred method of applying the layers of matrix metals to the diamond particles and support bases of the various embodiments of the invention described above is by means of a vapor deposition technique capable of being performed in different types of apparatus with metals in various physical states. A typical example of apparatus utilizing pure metals is shown in FIG. 9.

The mechanism shown in FIG. 9 for effecting vapor deposition of a metal matrix upon diamond particles initially positioned upon the operative surface of the base member of an abrading or cutting tool comprises a suitable vacuum chamber 50 in which a negative pressure of desired range is produced by vacuum pump 52. A suitable crucible 53 contains a supply of the matrix metal 54. Suitable heating means such as an induction coil 55 surrounds the crucible 53 not only to reduce the matrix metal to molten state, but also to heat it to a sufficient temperature that at least the upper surface portion of the molten metal emits an ionic vapor 56 thereof, which is shown somewhat diagrammatically as rising from crucible 53.

To control the deposition of the ionic metal vapor 56, the vaporized ions have a net electrical charge imposed thereon. By appropriate use of suitable electrical fields, electrical forces can be applied to the charged ions of the vapor not only to accelerate movement thereof, but also to guide the ions to the desired point of impact upon support base 32 of a tool, for example, for purposes of depositing a layer of such ions upon the diamond particles 38 upon the operating surface thereof.

For illustrative purposes, it is assumed that the ions of vapor 56 possess a positive electrical charge, it being understood that they can be rendered negative by reversing all polarities of the apparatus described hereinafter. Referring to FIG. 9, a negatively charged plate 58 has sufficient voltage applied thereto to attract the ions of vapor 56 in a manner to induce movement thereof away from the upper surface of the molten metal 40. An electrical field of substantial force also is applied between an electrode 60, which is attached to the crucible 53, and the support base 32. The potential of the electrical field between electrode 60 and the support base 32 is controlled by a suitable control unit 62 and the charge imposed upon plate 58 is regulated by a grid control unit 64. Such field, in conjunction with the force of plate 58, induces lateral movement of the ions in the form of a beam 70 thereof, as indicated in FIG. 9, in the form of a stream.

An electrostatic focusing electrode 66 also is contained within the evacuated chamber 50 and is provided with a passage 68 extending therethrough for purposes of controlling especially the cross-sectional area and shape of the beam 70 of the ions being propelled from the vapor 56 by means described above. For practical purposes, workpiece 32 is supported upon a suitable axis 72 and appropriate means, not shown in detail, are provided to rotate the support base 32 at a desired rate of speed and in a preferred direction about said axis. A layer of diamond particles 74 is illustrated as having been applied to the peripheral surface of support base 32 by one of the techniques described above. An appropriate focus control unit 76 is connected by a suitable circuit means to the focusing electrode 66.

Further to control the direction of movement of the beam 70 of metallic ions, the preferred embodiment of the mechanism contained within chamber 50 includes a pair of exemplary vertical deflection plates 78 and another pair of exemplary horizontal deflection plates 80 spaced longitudinally from the plate 78, as clearly shown in FIG. 9. Such arrangement is not to be regarded as restrictive, however. Suitable voltage control units 82 and 84 are connected by appropriate circuitry to the pairs of vertical and horizontal deflector plates 78 and 80. In addition, it will be understood that suitable external electrical equipment, not shown, is included in the arrangement otherwise illustrated in FIG. 9, especially for purposes of generating the various voltages required as well as control circuitry necessary to control the potentials on the various plates 58, 60, 78 and 80, and also upon the focusing electrode 66 and the support base 32 of the workpiece which receives the propelled and guided metallic ions of stream 70 thereof.

As indicated hereinabove, the ionic vapor 56 discharges from the upper portion of the heated crucible 53. The temperature of the matrix metal 54 within said crucible is controlled by a suitable temperature control unit 84, shown in FIG. 9. By varying the temperature of the molten matrix metal 54 by means of exemplary control unit 84, the quantity of ions generated may be regulated. The acceleration of such ions also may be quite accurately controlled by varying the strength of the electrical fields generated between electrode 60 and the support base 32, as well as upon plate 58.

In view of the particular location of the plate 58 and referring to the foregoing assumption that the charge upon the stream 70 of ions from vapor 56 is positive, it will be seen that if plate 58 has the charge imposed thereon changed from negative, as described above, to sufficiently positive, it is possible to prevent the ions from leaving the crucible 53, for example. However, when the plate 58 is charged negatively, and depending upon the potential of such negative charge, the ions of vapor 56 may be made to rise from the molten metal 54 of crucible 53 more rapidly than when a lesser negative potential is imposed upon the plate 58. Such greater acceleration of the rising ions is highly effective to overcome the charge ion cloud which normally forms at the upper surface of the molten metal 54. For purposes of further facilitating an understanding of the function of plate 58, it might be said that the function thereof is somewhat analogous to that of the control grid in a conventional vacuum tube such as employed in many types of electronic equipment.

Acceleration of the movement of the ions in stream 70 toward the support base 32 is utilized to impart kinetic energy thereto which is necessary to cause a controllable degree of penetration of the ions into the surfaces of the diamond particles and the support base 32 to achieve the desired results of the present invention. Further, the passage 68 in the focusing electrode or lens 66 shapes the stream of ions into the desired configuration of beam 70 quite readily and thus permits more precise control of the beam than otherwise would be possible and without changing the direction of flow thereof. Also, by passing the beam 70 between the vertical and horizontal deflection plates 78 and 80, the path of the beam 70 may be varied or altered as desired and actually may be so directed as to cause the beam to strike substantially any location or part of the support base 32 which is desired.

If no electrical field is passed between said horizontal and vertical deflection plates, the beam 70 may be made to strike a specific location upon the periphery, for example, of the support base 32, without variation. However, upon imposing electrical fields between the spaced vertical and horizontal pairs of deflection plates 78 and 80, such beam can be deflected vertically, for example, as illustrated diagrammatically by a double-headed arrow in FIG. 9. Such deflection is in proportion to the strength of the fields imposed respectively between the spaced plates of said pairs of deflecting plates 78 and 80. Also, the direction of the deflection depends upon the polarity of the impressed field. Both the horizontal and vertical deflection plates function in similar manners. Accordingly, to control the manner in which the beam 70 sweeps across the support base 32, for example, several techniques for operating the structure just described are possible, as follows.

If both sets of deflection plates 78 and 80 have a negative potential impressed upon them and, for example, the potential impressed upon the horizontal plates is gradually made more positive over a period of time, such as by the use of a suitable cycle of alternating current, the beam 70 will be made to develop a vertical line across the surface of the support base 32. Under the same circumstances, if the vertical potential simultaneously is increased by a desired increment and the horizontal potential is again rendered negative, the beam 70 can be made to sweep vertically again, whereby a second line will be inscribed across the support base 32, parallel to the first line referred to.

While the foregoing occurs, the receiving surface of the support base 32 and the diamond layer thereon are moved at a desired speed about the axis 72, for example, whereby, in relation to the rate at which the aforementioned lines of the beam 70 are made, said lines may be made to approximately touch each other. The aforementioned process is repeated very rapidly, each inscribing movement of such lines upon the support base 32 resulting in the entire surface of the support base 32 and the layer of diamond 74 thereon which are encountered by the beam 70 being coated with a layer of said ions of desired thickness. By suitably programming the controls by which said various fields and potentials are imposed upon the various plates and other charge-inducing elements of the mechanism shown in FIG. 9, it is possible to apply substantially any desired pattern of ions upon the aforementioned prepared surface of the support base 32.

From the foregoing, it will be seen that two variables need to be controlled in regard to the vapor deposition process thus far described. One of these variables is in regard to the velocity of the ions as they strike the surface of the support base 32 and the diamond particles 74 thereon, for example. Such control regulates the degree of penetration of the ions into the surfaces of both the diamond particles and support base 32. Such control is easily accomplished by regulating the potential between electrode plate 60 and the support base 32. In general, the ion velocity, and correspondingly the penetration referred to, is proportional to the potential just referred to.

The other variable to be controlled is in regard to regulating the thickness of the coating of the ions upon the support base 32 and the layer 74 of diamond particles thereon, and this can be done in a number of ways. For example, the rate at which the beam 70 of ions traverses or "scans" the surface of the support base 32 and the diamond particles thereon may be controlled, as described. A relatively slow rate or speed of scanning will result in a thicker coating of ions being deposited. Also, the intensity of the beam 70 can be controlled by means of the electrical potential imposed upon plate 58, as related to the temperature of the molten matrix metal 40 as controlled by the unit 84. Further, the thickness of the matrix layer may be controlled by depositing the material in more than one thin layer, for example, the same being superimposed upon each other. The ion velocity may be varied for each layer to obtain maximum penetration of the first layer.

Other sources of ionized pure metal vapors than those produced by the apparatus of FIG. 9 are possible in accordance with the principles of the invention. For example, electrodes of desired matrix metal may be suitably supported to provide an electric arc gap, whereby when current of the required voltage is connected to the electrodes to establish an arcing circuit, the electrodes gradually are converted to an ionized vapor. Such vapor may be shaped and propelled at desired velocities by mechanism similar to that shown in FIG. 9, except that the aforementioned arcing mechanism is substituted for the crucible 53 and heat source shown in FIG. 9.

It is realized that the transformation of matrix metals with which the present invention is concerned from solid to vapor state requires very high temperatures. Also, certain of the metals, such as, for example, beryllium, are difficult to maintain in the pure state such as would be required for use in the types of apparatus shown, for example, in FIG. 9. Accordingly, it is further contemplated by the present invention to employ metals of the class referred to above, which serve as a matrix to encapsulate the diamond particles, in the form of chemical compounds, as distinguished from being in substantially pure metallic state. The principal advantage of using said metals in compound form results from the fact that such chemical compounds decompose and emit ionic metal vapor at much lower temperatures than the volatilizing temperatures of the metals themselves. By way of example of the foregoing, few if any of the contemplated compounds volatilize at temperatures higher than 750° F.

The metals to be deposited as a matrix to encapsulate the diamond particles and adhere to the base member may be introduced as gaseous metal carbonyls or vaporized solutions of certain of the metal carbonyls in readily vaporizable solvents, and also as nitrosyl carbonyls, metal hydrides, organometallic compounds, and metal halides. Upon being subjected to predetermined maximum temperatures, these materials decompose and liberate vaporized metal and the other materials forming the various chemical compounds referred to above, particularly when subjected to either an inert gaseous atmosphere or vacuum.

Illustrative compounds of the carbonyl type are chromium, cobalt, molybdenum, nickel, titanium and tungsten, and mixed carbonyls thereof. Illustrative compounds of the other groups are nitrosyl carbonyls, for example, cobalt nitrosyl carbonyl; hydrides, such as titanium hydride; organometallic compounds, such as diphenyl (bis cyclopentadienyl) titanium, and bis-cyclopentienylchromium; and metal halides, such as beta cobalt (II) iodide, and molybdenum tetraiodide.

Each material from which a metal is to be derived for deposition as a matrix has a temperature at which decomposition is complete. However, decomposition may take place slowly at a lower temperature through some particular range. For example, titanium hydride completely decomposes at a temperature of approximately 752° F. However, this compound commences to decompose slowly in the vicinity of 400° F and decomposition continues during the time of heating from this temperature up to 752° F.

A large number of the metal carbonyls and hydrides may be effectively and efficiently decomposed at temperatures in the range of between 350° F and 450° F. When working with most metal carbonyls, it is preferred to operate in a temperature in the general decomposition range of the volatile compounds. Also, it is preferred that the support base of the tool to receive the metallic matrix shall be pre-heated to a temperature appreciably above room temperature and, preferably, slightly below the temperature of complete decomposition of the chemical compound from which the metal is derived. Such pre-heating of the support base preferably occurs in a vacuum or in an inert gaseous atmosphere so as to prevent oxidation of the support base. Such pre-heating also removes gases or water vapor entrapped or occluded in the pores or irregularities in the surface of the metallic support base, thereby enhancing the bonding of the metallic matrix to the exposed surfaces of the metallic support base of the tools.

From the foregoing, it will be seen that a number of different methods are described and illustrated for forming a plurality of different embodiments of so-called diamond abrading or cutting tools in which diamond particles are much more effectively bonded to the supporting surface of a metallic support base than has been possible heretofore when formed by electro-chemical procedures, sintered metal techniques and otherwise. Several arrangements respectively comprising the use of relatively hard metals as the matrix, and also a combination of such hard metals coated by softer metals results in the production of abrading and cutting tools possessing the ability to bond the diamond particles securely to the support base as well as to adjacent diamond particles in a manner by which the outermost surfaces of the diamond particles may wear away as work therewith progresses.

During such use there is no substantial wasting of the diamond particles, such as by the same being caused to be flicked from the tool when some of the particles engage unusual obstruction when operating relative to a surface of a workpiece as is common in many conventional types of diamond tools. When the diamond particles are additionally coated with an outer layer of relatively soft metal, a certain amount of resilience and elasticity is provided between adjacent diamond particles which are bonded together especially at the sides thereof by the softer metal, thereby enabling the diamond particles to absorb a greater amount of shock, without being flicked from the diamond tool surface as when abnormal conditions are engaged by the diamond particles during a working operation and especially an operation of a preliminary nature, such as when deeper and heavier cuts are undertaken as compared with lighter, polishing and finishing cuts.

While the invention has been illustrated and described in relation to the manufacturing of diamond tools, as briefly referred to above, the principles of the invention are adaptable advantageously to other manufacturing fields. By way of further example, a beryllium-copper alloy may be formed by propelling ions of beryllium against the surface of a copper article of manufacture which is to be case-hardened. The copper article is subjected to an opposite charge from that of the beryllium ions to impart kinetic energy to a stream of said ions and thereby cause the same to penetrate the molecular structure of at least desired portions of said article to a controlled depth of the material beneath the surface against which the ions are projected.

The source of the beryllium ions may be either chemical compounds or relatively pure metal. The application of the ions to the copper article occurs in an evacuated atmosphere, preferably of a high degree, and the copper article preferably is pre-treated by heating to a temperature sufficient to expel substantially occluded gases, and then is conditioned suitably for being subjected to vapor deposition of the beryllium ions therein by the method described in detail above. The beam or stream of ions also may be varied in direction and velocity by exemplary control means such as those shown in FIG. 9, whereby successive parallel stripes or other desired patterns of the ionic material may be discharged into the copper article to the desired depth of penetration and thickness, thereby causing a metallurgical reaction between the beryllium ions and the copper article to form an alloy which then, for example, may be subjected to precipitation hardening to provide a case-hardened surface on the copper article.

Another type of article of manufacture to which the invention is adapted comprises the bonding of aluminum ions to certain types of synthetic resins or plastics materials. For example, a number of resins such as acrylics, polycarbonates, polyesters, vinyl polymers, polystrenes and phenolics can be made electrically conductive. By imposing an electrical charge upon articles of manufacture made from a resin selected from those indicated while within an evacuated chamber and providing a stream of aluminum ions therein from a suitable source charged oppositely to said resin and directing said stream of the aluminum ions onto the resin article of manufacture at desired locations and in desired patterns by mechanism such as that shown in FIG. 9, or otherwise, as described above, said ions will penetrate the molecular structure of the resin article to a controlled depth and form a firm bond therewith.

Members of the acrylonitril-butadiene-styrene family of resins may also be used as the base member onto which metallic ions, such as aluminum, may be impinged in the manner described above to effect a firm bond therewith and thereby produce an article of manufacture of a firmly bonded, composite nature. Other metals such as chromium, copper and the noble metals may be transformed into ionic condition by any of the processes described above and bonded to suitable resins in a similar manner to the procedures described above.

While the invention has been described and illustrated in its several preferred embodiments, it should be understood that the invention is not to be limited to the precise details herein illustrated and described since the same may be carried out in other ways falling within the scope of the invention as claimed.

I claim:

1. A method of forming an abrading and cutting tool comprising a metallic support base and diamond particles bonded thereto by a metallic matrix of high tensile strength, said method comprising the steps of effecting preliminary adherence of diamond particles of a selected size range to an operative surface of said support base, vaporizing to ionic state in an evacuated atmosphere a metal of high tensile strength selected from the group consisting of chromium, cobalt, iron, molybdenum, nickel, tantalum, titanium, tungsten, vanadium and zirconium to form a bonding metallic matrix, and projecting said metallic matrix ions against the surfaces of said diamond particles and support base at a velocity adequate to penetrate said surfaces of said diamond particles and said support base respectively sufficiently to effect a chemical reaction with said diamond particles to form a carbide layer thereon and effect a metallurgical reaction with said support base to form an alloy layer thereon, thereby forming an integral chemical union between adjacent diamond particles and also between said particles and said support base.

2. The method according to claim 1 including the further step of controlling the depth of penetration of said metallic matrix ions to produce a coating layer thereof on said diamond particles which is sufficiently thin to form a lattice-like surface configuration providing recesses between at least a substantial number of adjacent diamond particles to accommodate material cut or ground from a workpiece until projected therefrom.

3. The method according to claim 1 including the further step of discontinuing the projection of said metallic matrix ions against the surfaces of said diamond particles after said carbide has been formed upon the surfaces of said diamond particles.

4. The method according to claim 1 further including the steps of forming said metallic matrix ions into a stream and oscillating said stream in successive paths transversely across the surfaces of said diamond particles and support base while moving said support base in a direction transverse to said paths to deposit a series of adjoining stripes of said metallic matrix ions upon said surface of said support base and the diamond particles adhered thereto to effect said union of said diamond particles with each other and said surface of said support base.

5. The method according to claim 4 including the further step of imposing an electrical potential between the source of matrix ions and said support base to attract the ions of said metallic matrix positively to said support base for deposit of said metallic matrix ions upon said base and diamond particles thereon.

6. The method according to claim 1 including the additional step of imposing an electrical potential between said source of metallic matrix vapor and support base, said potential being of sufficient strength to effect a thermionic emission of ions of said metallic matrix and attracting said ions positively to said support base to effect at least molecular penetration of said surface of said support base and said diamond particles by said ions to effect said chemical and metallurgical reactions therewith and provide said firm bond between said matrix material and said surface of said support base and said diamond particles.

7. The method according to claim 1 further including the steps of forming said metallic matrix ions into a beam-like stream, and directing and focusing said stream in a predetermined moving path to deposit said matrix ions in a predetermined configuration pattern upon the surfaces of said support base and diamond particles thereon.

8. The method according to claim 7 in which said moving path comprises a series of oscillations in successive parallel and opposite directions.

9. The method according to claim 8 including the further step of moving said support member and diamond particles thereon in a predetermined path to distribute said configuration of ions thereon to form an overall desired pattern.

10. The method according to claim 1 including the further step of continuing to project said metallic matrix ions upon the carbide layer formed upon the surfaces of the diamond particles and upon the surface of the alloy layer upon said support base to strengthen said carbide and alloy bonds and thereby better enable the abrading and cutting tool to effectively withstand use thereof.

11. The process according to claim 1 including the further step of vaporizing to ionic state a metal softer than the matrix metal of high tensile strength selected from the group consisting of aluminum, copper, lead, tin and zinc and projecting said softer metal ions against said matrix metal of higher tensile strength at a velocity adequate to penetrate the outer surfaces of said matrix sufficiently to form a metallurgical bond therewith by inosculation and thereby connect said diamond particles to each other with at least limited yieldability at the localities where said outermost layers of softer metal contact each other on adjacent diamond particles.

12. The process according to claim 11 including the further step of projecting said softer metal ions against the support base for said diamond particles at a velocity adequate to penetrate the outer surface thereof sufficiently to form a metallurgical bond by inosculation therewith and thereby also connect said diamond particles to said support base with at least limited yieldability at the localities where said diamond particles contact said support base.

13. An abrading and cutting tool formed by the method of claim 1.

14. An abrading and cutting tool formed by the method of claim 11.

* * * * *